United States Patent
Kangas et al.

(10) Patent No.: US 7,944,354 B2
(45) Date of Patent: May 17, 2011

(54) SYSTEM AND METHOD FOR SHOPPING CART SECURITY

(75) Inventors: Paul D. Kangas, Raleigh, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 11/947,284

(22) Filed: Nov. 29, 2007

(65) Prior Publication Data

US 2009/0140850 A1 Jun. 4, 2009

(51) Int. Cl.
G08B 13/14 (2006.01)
H04L 9/32 (2006.01)

(52) U.S. Cl. .......... 340/568.5; 340/568.6; 340/571; 340/572.1; 340/568.1; 340/539.1; 340/5.6; 340/5.82; 340/686.1; 235/375; 235/383

(58) Field of Classification Search .......... None
See application file for complete search history.

(56) References Cited

U.S. PATENT DOCUMENTS

| | | | | |
|---|---|---|---|---|
| 5,729,697 A * | 3/1998 | Schkolnick et al. | ............ | 705/23 |
| 5,739,513 A * | 4/1998 | Watanabe | ............ | 235/383 |
| 5,918,211 A | 6/1999 | Sloane | | |
| 6,435,407 B1 | 8/2002 | Fiordelisi | | |
| 6,484,939 B1 * | 11/2002 | Blaeuer | ............ | 235/383 |
| 6,659,344 B2 | 12/2003 | Otto et al. | | |
| 7,422,147 B2 * | 9/2008 | Rosenbaum | ............ | 235/383 |
| 7,839,276 B2 * | 11/2010 | Rodgers | ............ | 340/501 |
| 2002/0170961 A1 * | 11/2002 | Dickson et al. | ............ | 235/383 |
| 2004/0111320 A1 | 6/2004 | Schlieffers et al. | | |
| 2004/0262385 A1 * | 12/2004 | Blaeuer | ............ | 235/383 |
| 2005/0230472 A1 * | 10/2005 | Chang | ............ | 235/383 |
| 2006/0136303 A1 | 6/2006 | Bell et al. | | |
| 2006/0144933 A1 * | 7/2006 | Do et al. | ............ | 235/383 |
| 2006/0163349 A1 | 7/2006 | Neugebauer | | |
| 2006/0208072 A1 * | 9/2006 | Ku et al. | ............ | 235/383 |
| 2006/0265290 A1 | 11/2006 | Perrier et al. | | |
| 2006/0289637 A1 * | 12/2006 | Brice et al. | ............ | 235/385 |
| 2007/0057049 A9 * | 3/2007 | Kundu et al. | ............ | 235/383 |
| 2008/0011836 A1 * | 1/2008 | Adema et al. | ............ | 235/383 |
| 2008/0237339 A1 * | 10/2008 | Stawar et al. | ............ | 235/383 |
| 2010/0265068 A1 * | 10/2010 | Brackmann et al. | ....... | 340/572.1 |

* cited by examiner

Primary Examiner — Julie Lieu
(74) Attorney, Agent, or Firm — Cantor Colburn LLP; Thomas Tyson

(57) ABSTRACT

A system for securing purchased items, includes: an enclosure for holding items selected by a user; a personal shopping system (PSS) further comprised of an input/output device, a scanner, software, and security features for securing the items selected by the user and placed in the enclosure; wherein the PSS is in electrical signal communication with a server; wherein the PSS is mechanically attached to the enclosure; wherein the user identifies themselves to the PSS; wherein the security features activate one of a series of visual indicators and alarms in response to various states and relationships between the enclosure, the items, and the user; and wherein the intensity, level, and duration of the series of visual indicators and alarms varies in response to the various states and relationships between the enclosure, the items, and the user.

20 Claims, 4 Drawing Sheets

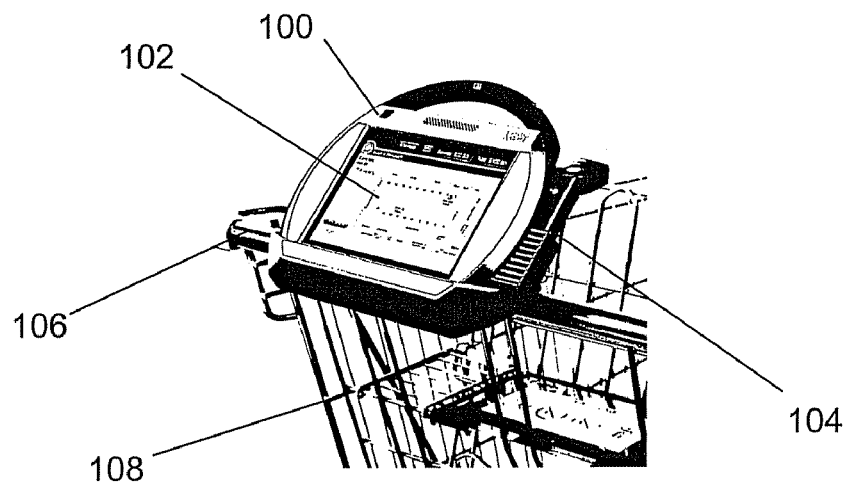
FIG. 1 (Prior Art)
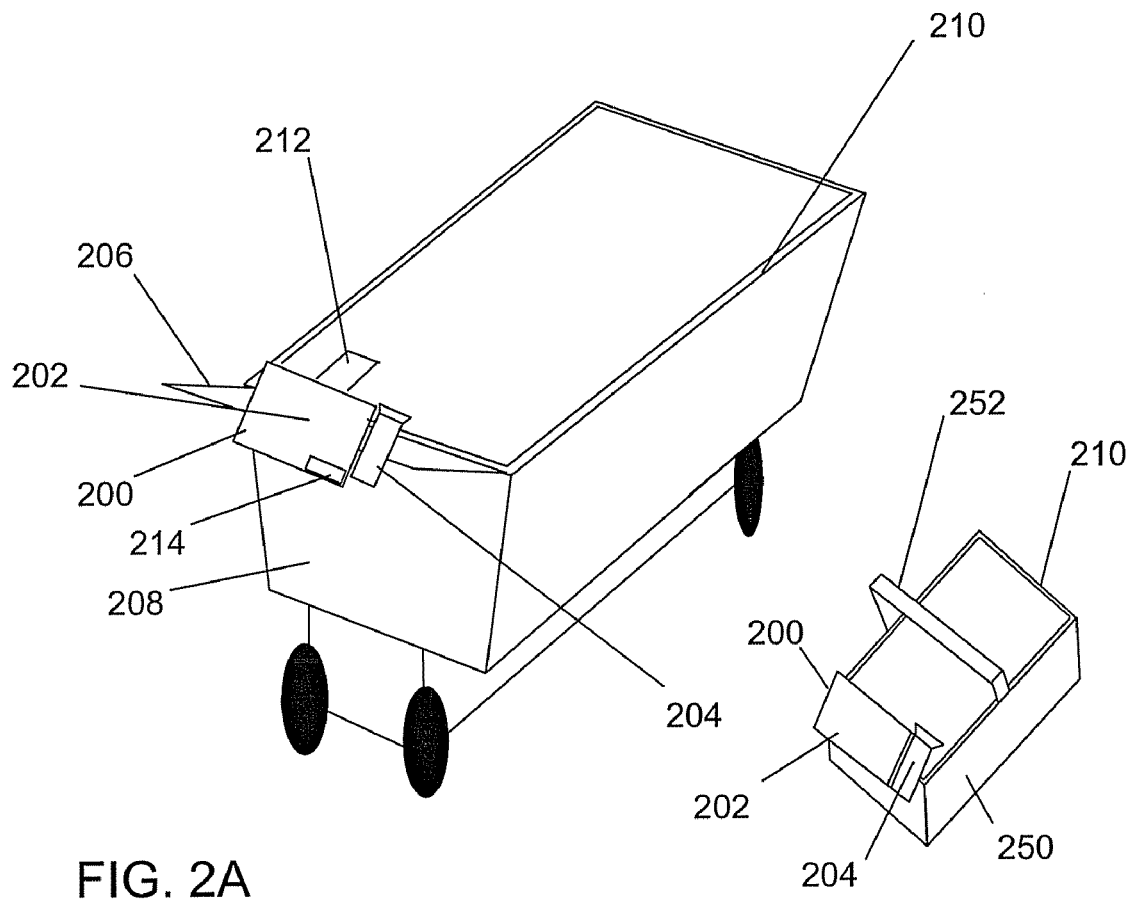
FIG. 2A
FIG. 2B

SYSTEM AND METHOD FOR SHOPPING CART SECURITY

BACKGROUND OF THE INVENTION

1. Field of the Invention

This invention relates generally to retailing, and more particularly to a system, article, and method for implementing shopping cart security in a retail environment utilizing cameras and radio frequency identification (RFID) technologies.

2. Description of the Related Art

Faced with fierce competition, retailers are always looking for ways to improve their operational efficiency and enhance the customer's shopping experience. In an effort to address both the need of the retailer to improve their operational efficiency and to improve overall customer satisfaction, International Business Machines Corporation has introduced the personal shopping assistant (PSA). FIG. 1 illustrates a PSA 100, which is a sophisticated computing system that mounts on shopping carts 108, or the shopping cart handle 106, and guides customers through the retail environment, while tracking and recording the customer's purchases. Through the use of a wireless touch screen tablet 102 and hand scanner 104, customers may scan items for self-checkout, pre-place special orders in various departments in a store, and find items in the store. The customer's ability to scan items for self-checkout and bagging reduces the required level of staffing at checkout lanes.

A system utilizing PSA technology provides for powerful point-of-purchase retailing, by delivering relevant promotions to shoppers in real-time, based on historical purchase behavior and the shoppers current location in the store. Through the use of loyalty cards assigned to identify customers, the PSA system may display electronic coupons based on past purchases. The PSA system showcases store specials within a shopper's current vicinity, automatically updating the touch screen tablet 102 screen as a customer traverses the store. By sending relevant promotions to consumers while they shop, retailers offer a more personalized, convenient shopping experience to promote repeat business. In addition, the ability to communicate specials electronically offers significant savings over traditional advertising mediums. The powerful point-of-purchase features offered by PSA technology act to enhance the shopping experience, increase customer satisfaction, while strengthening customer loyalty and driving sales.

The high level of integration offered by PSA technology also provides retailers with real-time customer buying and store traffic patterns that assist the retailer to optimize product placement, reduce stock-outs, and adjust staffing levels and their placement in the retail environment.

SUMMARY OF THE INVENTION

Embodiments of the present invention include a system, method, and article for securing purchased items, the system includes: an enclosure for holding items selected by a user; a personal shopping system (PSS) further comprised of an input/output device, a scanner, software, and security features for securing the items selected by the user and placed in the enclosure; wherein the PSS is in electrical signal communication with a server; wherein the PSS is mechanically attached to the enclosure; wherein the user identifies themselves to the PSS; wherein the security features activate one of a series of visual indicators and alarms in response to various states and relationships between the enclosure, the items, and the user; and wherein the intensity, level, and duration of the series of visual indicators and alarms varies in response to the various states and relationships between the enclosure, the items, and the user.

A method for securing items purchased with a personal shopping system (PSS), the method includes: receiving the identity of a user; receiving scanned data of an item; recording an item passing through a detection plane in an enclosure; activating one of a series of visual indicators and alarms in response to various states and relationships between the enclosure, the items, and the user; and wherein the intensity, level, and duration of the series of visual indicators and alarms varies in response to the various states and relationships between the enclosure, the items, and the user.

An article comprising one or more computer-readable storage media containing instructions that when executed by a computer enables task execution improvement; wherein the method further includes: receiving the identity of a user; receiving scanned data of an item; recording an item passing through a detection plane in an enclosure; activating one of a series of visual indicators and alarms in response to various states and relationships between the enclosure, the items, and the user; and wherein the intensity, level, and duration of the series of visual indicators and alarms varies in response to the various states and relationships between the enclosure, the items, and the user.

TECHNICAL EFFECTS

As a result of the summarized invention, a solution is technically achieved for a method, article, and system for implementing shopping cart security in a retail environment utilizing cameras and radio frequency identification (RFID) technologies

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an existing implementation of a personal shopping assistant (PSA) mounted on a shopping cart handle bar.

FIG. 2A illustrates a personal shopping system (PSS) and shopping cart with security features according to embodiments of the invention.

FIG. 2B illustrates a personal shopping system (PSS) and hand held enclosure or basket with security features according to embodiments of the invention.

Figure 3:
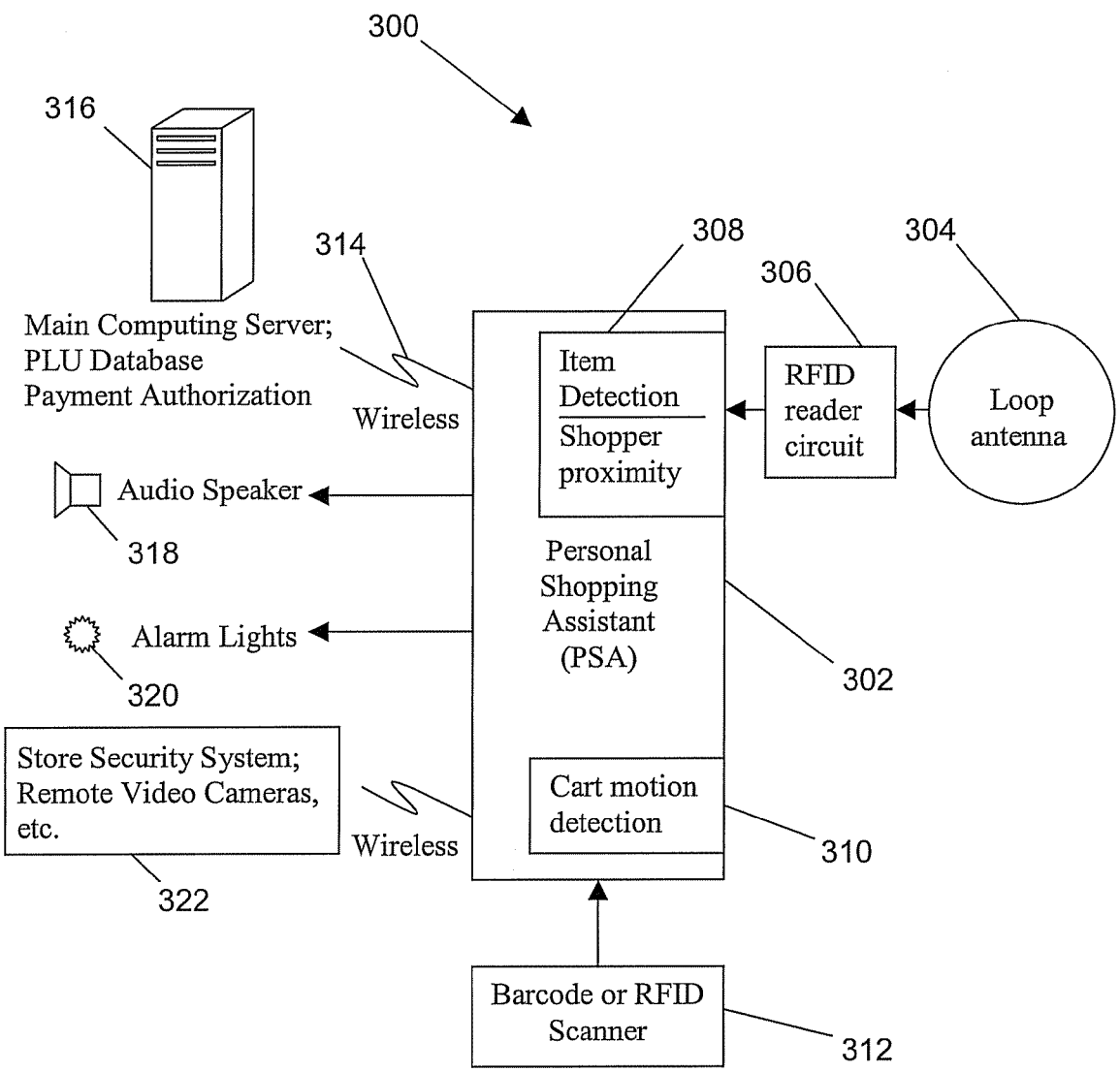
FIG. 3 illustrates a functional block diagram of a PSS system equipped with security features according to embodiments of the invention.

The detailed description explains the preferred embodiments of the invention, together with advantages and features, by way of example with reference to the drawings.

DETAILED DESCRIPTION

The advent of mobile shopping devices, for example a personal shopping assistant (PSA) mounted to a shopping cart, and the scanning and purchasing of items as a customer proceeds through a retail environment has necessitated the need for a means to secure customer purchases that have been recorded and have been placed in a customer's cart. Without a means for securing customer purchases, a shopper is susceptible to an individual reaching into their cart and having an item removed that has been purchased without the customer's knowledge.

Embodiments of the invention provide a system, method, and article for providing a means to secure items in a customer cart that have been purchased with a PSA type system. Embodiments of the invention provide a mechanism for determining the motion of items moving into or out of a shopper's cart. Furthermore, embodiments of the invention have a mobile shopping device, such as a PSA, that processes an algorithm to determine if motion attributed to an item is expected, and when and if a warning alarm or signal should be activated. In addition, embodiments of the invention have mechanisms for determining the proximity of a shopper to their designated cart, and for determining when the cart itself is in motion.

FIG. 2A illustrates an embodiment of the invention with a mobile shopping device 200, in the form of a PSA, which is attached to the handle bar 206 of a cart 208. The mobile shopping device 200, herein referred to as a personal shopping system PSS 200, is equipped with an input/output device, such as a touchscreen and controls 202, as well as a hand scanner 204, wired or wireless, for reading the type and quantity of items that are being purchased and placed in the cart 208. The hand scanner 204 may be able to read barcodes or pick up RFID signals from RFID tags pre-attached to the items, or other means or methods for individual product identification. Security related features in the embodiment of FIG. 2 include sensors, such as an optical device or camera 212 mounted to the cart 212, integrated into the PSS 200, or mounted on a docking bracket/station located on the cart 208, and a loop antenna 210 along the upper periphery of the opening in the cart 208 for detecting the entry and exit of RFID tagged items from the cart 208, and proximity sensing devices 214 to detect the presence or absence of a user.

FIG. 2B illustrates an embodiment of the invention in the form of a hand carried enclosure or basket 250 with carrying handles 252. The hand carried enclosure or basket 250 has a mobile shopping device 200 equipped with touch screen and controls 202, hand scanner 204, and loop antenna 210.

The optical device or camera 212, which may take the form of a charged coupled device (CCD) imager, or other known technologies that generate graphical digital outputs that are readable by a computing algorithm, detects motion into the cart 208, an items presence, and the motion of the cart 208 itself, and determines through an algorithm whether the detected motion was expected or unexpected. The video detection and motion algorithm is started when an object is scanned for purchase. Location and motion information, about the objects/products derived from the video detection and motion algorithm, is periodically sent to the personal shopping computer cart security application.

The optical device or camera 212 is equipped with a wide-angle lens sufficient to view the entire cart's 208 top boundary perimeter and a portion of the cart's 208 surroundings. The cart's 208 top boundary perimeter is known and charted graphically to video processing software, to facilitate a determination by the software when an object/product has crossed the plane of the shopping cart opening, and establishing the objects/product's position as being inside or outside of the cart 208. The cart top boundary perimeter and associated graphical envelope may be calibrated on each PSS camera individually, or a predetermined stored boundary for a known camera mounted location, mounting angle, and lens type may be used.

Existing video motion detection algorithms track the movement (change of position) of a group of pixels in successive video frames. The pattern of pixels will move together, but their overall location will change in the X and/or Y-axis direction as motion occurs. The motion detection algorithms utilize software to process video frames from the camera 212 to determine positional changes of the pixel pattern by comparing the successive video frames to determine motion. Analysis of successive video frame pixel data maybe used to determine object motion, presence or absence of objects, and motion of the shopping cart relative to the cart's surroundings. If an unexpected motion or absence occurs the PSS 200 will sound a warning alarm.

FIG. 3 illustrates a functional block diagram of a personal shopping system (PSS) 300 equipped with security features according to embodiments of the invention. The PSS 300 consists of a mobile shopping device, such as a personal shopping assistant (PSA) 302, with wireless communication capabilities (as denoted by symbol 314) mounted to a hand held portable enclosure or mobile cart, both having an opening for placing items within. The wireless communication capabilities 314 enable communication with a main computing server 316 that contains a price look up (PLU) database, which has item descriptions and item costs, and for payment authorization of credit or debit card, store credit, or other purchase methods. The wireless communication capabilities 314 of the PSA 302 also enable interaction with store security systems and remote video cameras (block 322). The store security system acts as a remote alarm warning system for tracking the theft of items leaving the store. Audio speakers 318 and alarm lights 320 act as local warnings and indicators to the customer.

The PSA 302 is in electrical signal communication with a barcode or RFID scanner 312 for recording the acquisition and purchase of items, an item detection and shopper proximity sensor device 308, and a cart motion detection device 310. The cart motion detection device 310 utilizes radio frequency (RF) triangulation methods, such as changes in Institute of Electrical and Electronics Engineers (IEEE) 802.11 wireless link signal measurements to detect motion. Several other location methods may be used, including external infrared beacons or a small video camera, as well as a plethora of additional methods, to detect cart motion.

To facilitate detection of motion and presence of a product object using RFID technology, a loop antenna 304 is affixed along the perimeter of the hand held portable enclosure or mobile cart to detect the entry and exit of RFID tagged items through a detection plane formed by the loop antenna 304. The RFID reader circuit 306 interfaces with the loop antenna 304, and transmits RFID tag number as the item enters or exits the hand held portable enclosure or mobile cart to the PSA 302. The PSA utilizes the RFID tag number as a lookup value in the PLU database. The shopper proximity sensor device 308 may also utilize RFID technology by sensing the presence of an RFID chip embedded in a customer's loyalty card. If a customer and presumably their loyalty card with RFID chip is within a predefined pick up range, the customer is considered to be with the hand held enclosure, basket, or cart. Additional means to detect the presence of a customer may include Bluetooth enabled devices, such as customer key fobs, infrared detection, RF field distortion measurements, and ultra violet detection, or a small camera to detect the shopper and their distance from the cart.

Embodiments of the invention utilize a time based security-monitoring algorithm based on observed customer shopping habits, such as the length of time a customer is normally away from their cart or basket, the time period between a product scan and placement within the cart or basket, and removing an item from the cart or basket. If the expected time for placing an item in the cart or basket following scanning is exceeded, a security reminder alert may be issued to the customer. If an item is removed from the basket or cart without rescanning for removal via a bar code or RFID scanner, a potential illegitimate item removal may have occurred. The security alert may be progressively time based, where after a predefined time period the tone of the alarm or frequency or intensity of warning indicator lights will change or increase.

The customer may have individual control over some of the security features and alarms. For example, the customer may turn off the alarm for the purpose of rearranging items within their cart. To disable security features the customer may be required to present their loyalty card, enter a code, or use a biometric reading device such as a fingerprint sensor. To improve accuracy and system performance, security monitoring of products may be based on item cost. A configurable threshold monitors products above a certain price level. Security can also be based on a product weighting and ranking system, where items more prone to theft will receive a higher weighting, and items falling below a threshold rank are not monitored by the security features of embodiments of the invention.

The audio alarms of embodiments of the invention are multi toned, where a first warning tone is given to a customer to perform a requested action, If the customer does not respond within a given time limit, a second one (louder or of a different duration) will sound. A warning algorithm of the security-monitoring algorithm controls the audio alarms. The warning algorithm may utilize cart motion sensing compensation to reduce false alarms. For example, cart motion reduces the sensitivity of the security system to reduce false alarms in response to shifting items with in the carts due to the cart's motion.

A cart lock feature in embodiments of the invention detects if an individual is attempting to steal the entire cart. The cart lock feature may be activated manually via a mobile shopping device of embodiments of the invention, or automatically as the proximity of the customer exceeds a defined threshold away from the cart. A visual or audible indicator may be present that the security system is armed and the cart is locked. A visual warning indicator is used for the hearing impaired, while audio warning indicators are used for the visual impaired. In addition, alternative means for signaling or sending security alerts to customers are via cell phone, personal digital assistants (PDA), and Internet or email notifications.

Figure 4:
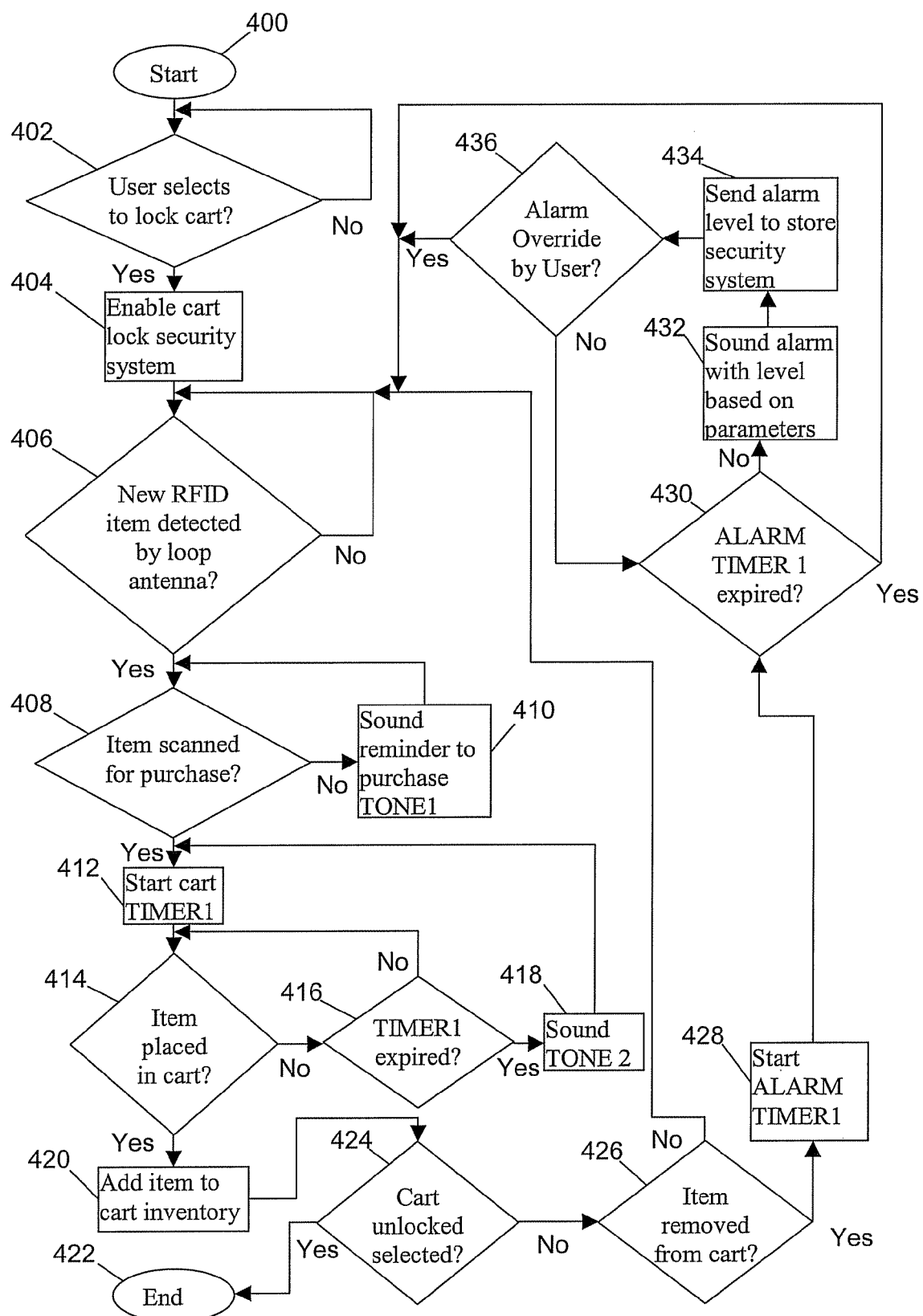
FIG. 4 is a flowchart that illustrates the operation of security features for a PSS mounted to a shopping cart according to embodiments of the invention.

FIG. 4 is a flowchart that illustrates the operation of security features for a PSS mounted to a shopping cart according to embodiments of the invention. The process starts (block 400) when the user selects to lock their cart (decision block 402 is Yes) and enables the cart lock security system (block 404). When a new item for purchase is placed in the cart or is in the vicinity of the cart, and is detected by the RFID loop antenna or a camera (decision block 406 is Yes), a check is made to see if the item has been scanned by the user for purchase (decision block 408). If the item has not been scanned (decision block 408 is No), a reminder TONE 1 is initiated (block 410) to remind the user to purchase the item by scanning the item into the system. If the item has been scanned for purchase (decision block 408 is Yes), a count down cart TIMER 1 (block 412) is initiated to measure the period of time before the scanned item is placed in the cart. If the item is placed in the cart (decision block 414 is Yes), before count down TIMER 1 expires, the item is added to the user's cart inventory (block 420). However, if the item has not been added to the cart (decision block 414 is No), and the count down TIMER 1 expires (decision block 416 is Yes), a second TONE 2 is sounded (block 418) which differs from TONE 1, as a reminder to the user to place the purchased item into the cart for safekeeping. If the cart is unlocked by the user (decision block 424 is Yes), and the security features are disarmed, the process ends (block 422).

However, if the cart remains locked (decision block 424 is No) and an item is removed from the cart (decision block 426 is Yes), an ALARM TIMER 1 is started (block 428) and an alarm is sounded (block 432). The alarm is sounded (block 432) with a level based on various parameters and scenarios that are defined in a state diagram in FIG. 5, for as long as ALARM TIMER 1 has not expired (decision block 430 is No) and has not been overridden by the user (decision block 436 is No). Otherwise (decision block 426 is No), the system awaits further purchases. During the sounding of the alarm (block 432), the alarm level is also sent to store security (block 434). Store security may be used as a means for further tracking the theft of items via store wide video cameras and security personnel. If the alarm is overridden by the user (decision block 436 is Yes), the system awaits further purchases.

Figure 5:
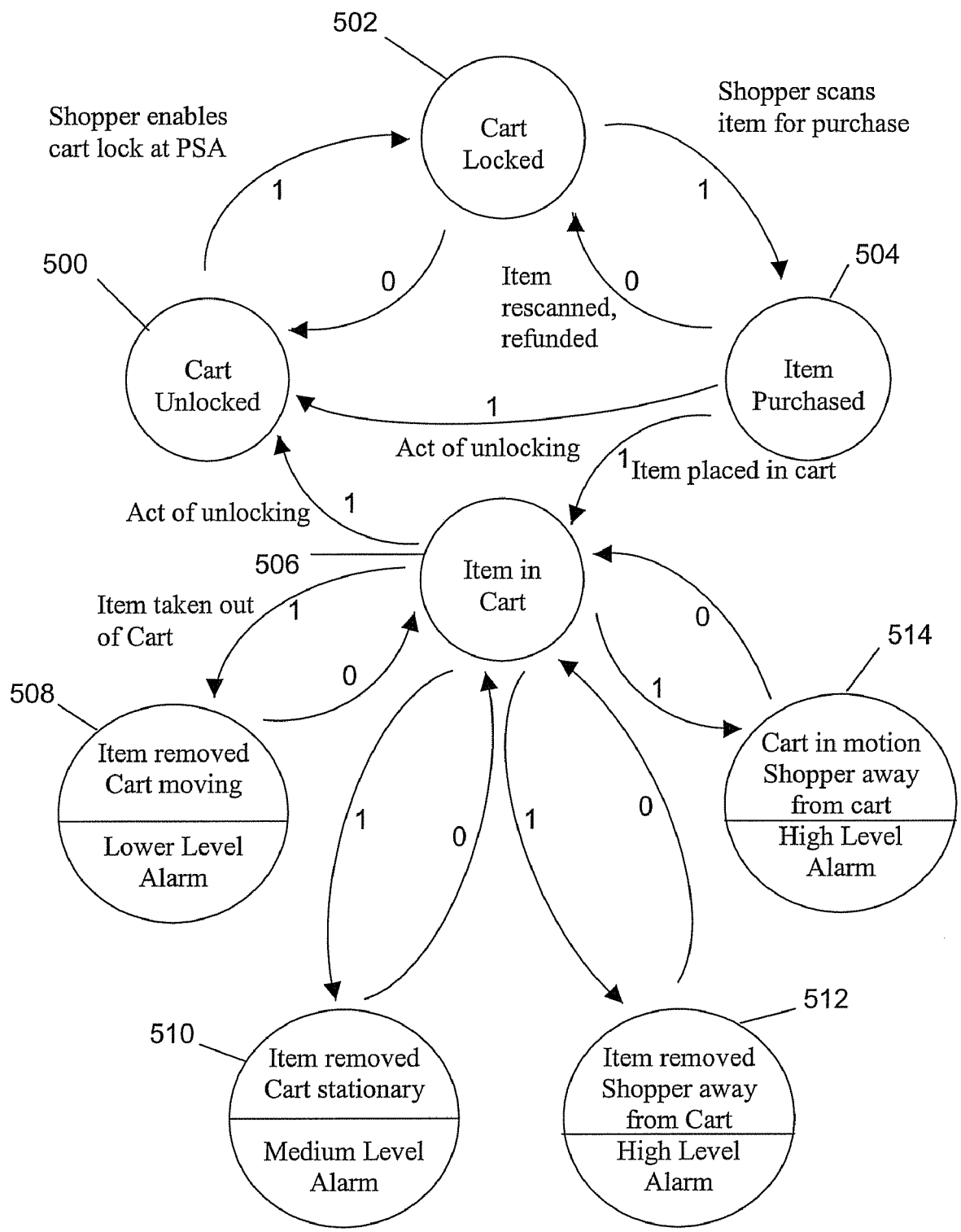
FIG. 5 is a state diagram that illustrates the operation of security features for a PSS mounted to a shopping cart according to embodiments of the invention.

FIG. 5 is a state diagram that illustrates the operation of security features for a PSS mounted to a shopping cart according to embodiments of the invention. State 502 represents a cart that is unlocked (security features disabled), while moving to state 502 represents the activation of security features and locking the cart. Movement from state 502 (cart locked) to state 504 (item purchased) represents the action of the user scanning and purchasing an item, while the opposite movement (504 to 502) represents the item being rescanned and returned. Movement from state 504 (item purchased) to state 506 (item in cart) represents the user placing a scanned and purchased item in a cart. States 508, 510, 512, and 514 represents various alarm level scenarios. In states 508, 510, 512, and 514 input conditions are presented above the line in the state circle, while output results are presented below the line within a state. Movement from state 506 (item in cart) to state 508 represents an item being removed from a cart in motion, with a lower level alarm response since items in the cart may shift naturally as the cart motion stops and starts. Movement from state 506 (item in cart) to state 510 represents an item removed from a stationary cart without rescanning the item by the user, with a medium level alarm response. However, high level alarms are sounded in states 512 and 514 due to the absence of the user from the immediate proximity of their cart. Movement from state 506 (item in cart) to state 512 represents an item removed from a cart while the user is away from the cart. Movement from state 506 (item in cart) to state 514 represents a cart in motion without the user present.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for securing purchased items, the system comprising:
   an enclosure for holding items selected by a user;
   a personal shopping system (PSS) further comprising an input/output device, a scanner, software, and security features for securing the items selected by the user and placed in the enclosure;
   wherein the PSS is in electrical signal communication with a server;
   wherein the PSS is mechanically attached to the enclosure;
   wherein the user identifies themselves to the PSS;
   wherein the security features activate one of a series of visual indicators and alarms in response to various states and relationships between the enclosure, the items, and the user; and
   wherein the intensity, level, and duration of the series of visual indicators and alarms varies in response to the various states and relationships between the enclosure, the items, and the user.

2. The system of claim 1, wherein the enclosure comprises at least one of a cart and a hand held basket.

3. The system of claim 1, wherein the input/output device is a touchscreen display device; and
   wherein the touchscreen is configured for displaying item and retailing information, as well as user selectable security options and alerts.

4. The system of claim 1, wherein the scanner is configured for reading at least one of: barcodes and radio frequency identification (RFID) tags affixed to the items.

5. The system of claim 1, wherein one or more motion detectors determine movement of the enclosure utilizing one or more of the following: radio frequency triangulation, external infrared beacons, and cameras; and
   wherein the sensitivity of the security features are adjusted based on the movement of the enclosure.

6. The system of claim 1, wherein the security features further comprise a cart lock;
   wherein the cart lock is configured for at least one of: manually enablement by the user, and automatic enablement in the event the proximity of the user from the enclosure exceeds a predetermined threshold distance; and
   wherein one of the set of visual indicators and alarms from the series of visual indicators and alarms is activated.

7. The system of claim 1, wherein the security features further comprise wireless capabilities to communicate with a store security system;
   wherein the store security system has remote alarms and video cameras to prevent theft from the store.

8. The system of claim 1, wherein the user disables certain security features in response to one or more of the following: presenting a loyalty card, entering a code, or utilizing a biometric reading device.

9. The system of claim 1, wherein security features for items to be monitored are based on one or more of weighting, rankings, and threshold values.

10. The system of claim 1, wherein the security features further comprise a loop antenna positioned around the upper periphery of an opening of the enclosure;
    wherein the loop antenna is in electrical signal communication with the PSS;
    wherein the loop antenna forms a detection plane that is operable to detect the user selected items as they pass through the detection plane; and
    wherein the user selected items have RFID tags affixed to thereto.

11. The system of claim 10, wherein in response to a user selected RFID tagged item that has not been scanned with the scanner prior to passing through the detection plane and entering the enclosure, a first set of visual indicators and alarms from the series of visual indicators and alarms is activated.

12. The system of claim 10, wherein in response to a RFID tagged item being removed by the user from the enclosure, and passing through the detection plane without being rescanned, a second set of visual indicators and alarms from the series of visual indicators and alarms is activated.

13. The system of claim 10, wherein in response to a RFID tagged item being removed from the enclosure, and passing through the detection plane without the user being present, a third set of visual indicators and alarms from the series of visual indicators and alarms is activated;
    wherein the presence of the user in relation to the enclosure is detected by one or more proximity sensors in electrical communication with the PSS;
    wherein the one or more proximity sensors utilize signals to establish user presence, from one or more of the following: RFID chips embedded on user loyalty cards, user Bluetooth enabled devices, radio frequency (RF) field distortion measurements, ultra violet detection, and cameras.

14. The system of claim 1, wherein the security features further comprise optical devices;
    wherein the optical devices are equipped with a wide angle lens sufficient to view a top boundary perimeter plane of the enclosure;
    wherein the top boundary perimeter plane forms a detection plane; and
    wherein the optical devices detect the motion of items into and out of the enclosure.

15. The system of claim 14, wherein in response to the optical devices detecting an item that has not been scanned with the scanner prior to passing through the detection plane and entering the enclosure, a first set of visual indicators and alarms from the series of visual indicators and alarms is activated;
    wherein in response to an item being removed by the user from the enclosure, and passing through the detection plane without being rescanned, a second set of visual indicators and alarms from the series of visual indicators and alarms is activated.
    wherein in response to an item being removed from the enclosure, and passing through the detection plane without the user being present, a third set of visual indicators and alarms from the series of visual indicators and alarms is activated;

wherein the presence of the user in relation to the enclosure is detected by one or more proximity sensors in electrical communication with the PSS;

wherein the one or more proximity sensors utilize signals to establish user presence, from one or more of the following: RFID chips embedded on user loyalty cards, user Bluetooth enabled devices, radio frequency (RF) field distortion measurements, ultra violet detection, and cameras.

16. The system of claim 14, wherein the optical devices generate graphical digital outputs that are readable by a computer algorithm;

wherein the computer algorithm employs video processing software to determine when an item has crossed the top boundary perimeter of the enclosure.

17. The system of claim 16, wherein the computer algorithm determines whether the motion of the item was expected or unexpected.

18. The system of claim 16, wherein the computer algorithm detects motion by tracking movement of a group of pixels in successive frames.

19. A method for securing items purchased with a personal shopping system (PSS), the method comprising:
receiving the identity of a user;
receiving scanned data of an item;
recording an item passing through a detection plane in an enclosure;
activating one of a series of visual indicators and alarms in response to various states and relationships between the enclosure, the items, and the user; and
wherein the intensity, level, and duration of the series of visual indicators and alarms varies in response to the various states and relationships between the enclosure, the items, and the user.

20. An article comprising one or more computer-readable storage media containing instructions that when executed by a computer enables task execution improvement; wherein the method further comprises:
receiving the identity of a user;
receiving scanned data of an item;
recording an item passing through a detection plane in an enclosure;
activating one of a series of visual indicators and alarms in response to various states and relationships between the enclosure, the items, and the user; and
wherein the intensity, level, and duration of the series of visual indicators and alarms varies in response to the various states and relationships between the enclosure, the items, and the user.

* * * * *